United States Patent [19]

Kitazawa

[11] Patent Number: 4,954,859
[45] Date of Patent: Sep. 4, 1990

[54] MOTOR DRIVEN CAMERA
[75] Inventor: Toshiyuki Kitazawa, Tokyo, Japan
[73] Assignee: Asahi Kogaku Kogyo K.K., Tokyo, Japan
[21] Appl. No.: 301,362
[22] Filed: Jan. 25, 1989
[30] Foreign Application Priority Data Jan. 28, 1988 [JP] Japan .................................. 63-17609
Jan. 28, 1988 [JP] Japan .................................. 63-17610

[51] Int. Cl.$^5$ .............................................. G03B 1/12
[52] U.S. Cl. ................................................ 354/173.11
[58] Field of Search ......................... 354/173.1, 173.11

[56] References Cited

U.S. PATENT DOCUMENTS 4,474,442 10/1984 Shiozawa et al. ............... 354/173.11
4,671,635  6/1987 Ohara et al. ...................... 354/173.1
4,679,926  7/1987 Suzuki et al. .................... 354/173.11
4,720,721  1/1988 Hamada et al. ................. 354/173.11
4,780,734 10/1988 Ogawa et al. ................... 354/173.11

FOREIGN PATENT DOCUMENTS 55-155336 12/1980 Japan .
56-50259  11/1981 Japan .

Primary Examiner—Michael L. Gellner
Attorney, Agent, or Firm—Sandler, Greenblum & Bernstein

[57] ABSTRACT

A motor driven camera having a motor for winding a film includes a pulse generator which generates one pulse for every perforation of the film in association with feeding of the film, a pulse counter for counting the number of pulses generated by the pulse generator, and a motor control circuit which stops the motor when the pulse counter counts pulses.

27 Claims, 3 Drawing Sheets

MOTOR DRIVEN CAMERA

BACKGROUND OF THE INVENTION

1. Field of the Invention

The present invention relates to a motor driven camera in which film is wound and rewound by a motor.

2. Description of Related Art

In a conventional motor driven camera, a mechanism for feeding and stopping a frame of film is functionally independent from a mechanism for confirming or detecting a loading of a film, a terminal end of the film, a rewinding operation of the film, the completion of rewinding of the film or the like. The conventional camera mechanism has a rotor which rotates by one turn when a frame of film is fed, in association with a sprocket for feeding the film, regardless of the number of teeth of the sprocket. The film feeding mechanism further includes a one-turn switch which is made ON and OFF by the rotor to turn the motor ON and OFF. The one-turn switch also restricts the position of a picture plane with respect to the perforations of the film.

On the other hand, the mechanism for confirming or detecting the state of the film has a pulse generator which generates pulses in association with the rotation of the sprocket, so that the state of the film can be confirmed or detected by the pulse signals.

In particular, in a recent single-lens reflex camera, a spool drive is used in place of the sprocket drive mentioned above. In the spool drive, the film is fed by the sprocket when the film is loaded, but once the film is engaged onto the spool, the film is wound by the rotation of the spool. In the spool drive type, the sprocket always rotates when the film is loaded; that is, it rotates even when the film is not actually wound onto the spool. Therefore, it is impossible to detect a loading error by only detecting the rotation of the sprocket. This is the reason that a special mechanism for detecting such a loading error is indispensably provided in a conventional camera. For instance, the special detecting mechanism has a rotating member which continuously bears against the film to rotate in accordance with the movement of the film, so that the state of the film can be detected by rotation signals or rotation stop signals of the rotating member.

However, the inventor of the present invention has found that it is not necessary to provide a separate film feeding mechanism and film state detecting mechanism. The inventor's interest has been directed to the consolidation of the above-mentioned two mechanisms. To realize the consolidation, the inventor has conceived that the pulses which are generated in association with the feed of film should be functionally associated with the perforations of the film.

SUMMARY OF THE INVENTION

The primary object of the present invention is to provide a motor driven camera in which a mechanism for feeding and stopping a frame of film and a mechanism for detecting or confirming the state of the film are consolidated with each other.

Because number of perforations for one frame of film is always exactly 8, if one pulse is generated for every perforation or for every two or four perforations in association with film feeding, both the stoppage of a frame of the film and the restriction of the position of the picture plane relative to the perforations can be effected by stopping the motor when the number of pulses is 8, 4 or 2. In this case, the above-mentioned pulses can also be used to detect the state of the film.

To achieve the object mentioned above, according to the present invention, there is provided a motor driven camera in which the winding of the film is effected by a motor, comprising a pulse generator which generates one pulse for every perforation or for every two or four perforations in association with the feed of the film, means for counting the number of pulses, and a motor control circuit which stops the motor when the number of pulses counted by the pulse counting means is 8, 4 or 2.

According to another aspect of the present invention, the motor driven camera further includes a pulse judging circuit to which the pulses are input from the pulse generator, and an indicator which indicates the state of feeding of the film in accordance with the presence and absence and duration of the pulses detected by the pulse judging circuit. The indicator can be realized by, for example, a liquid crystal panel or the like.

In theory, it is possible to index the frames of film and to restrict the position of the picture plane relative to the perforations by generating one pulse for 8 perforations. However, in this case, the number of pulses is not enough to detect the state of the film. Accordingly, in practice, one pulse should be generated for at least every 4 perforations by the pulse generator. Preferably, one pulse is generated for one perforation.

In the case of a spool drive type camera, the pulse generator can be constructed as follows.

The sprocket is divided into upper and lower sprocket elements that are rotatable relative to each other, each having teeth which can be engaged by corresponding upper and lower perforations of the film. One of the sprocket elements (usually, the lower sprocket element) which comes into engagement with the perforations of a film leader portion forms a driving sprocket which drives the film at the time of film loading. The other sprocket element (upper sprocket element) forms a driven sprocket which is driven by the perforations of the film. The pulses are generated by the rotation of the driven sprocket.

With this arrangement, the spool drive mechanism operates normally and the state of film feeding, including automatic film loading, can be detected only by the sprocket mechanism.

BRIEF DESCRIPTION OF THE DRAWINGS

The invention will be described below in detail with reference to the accompanying drawings, in which.

DETAILED DESCRIPTION OF PREFERRED EMBODIMENT

Figure 1:
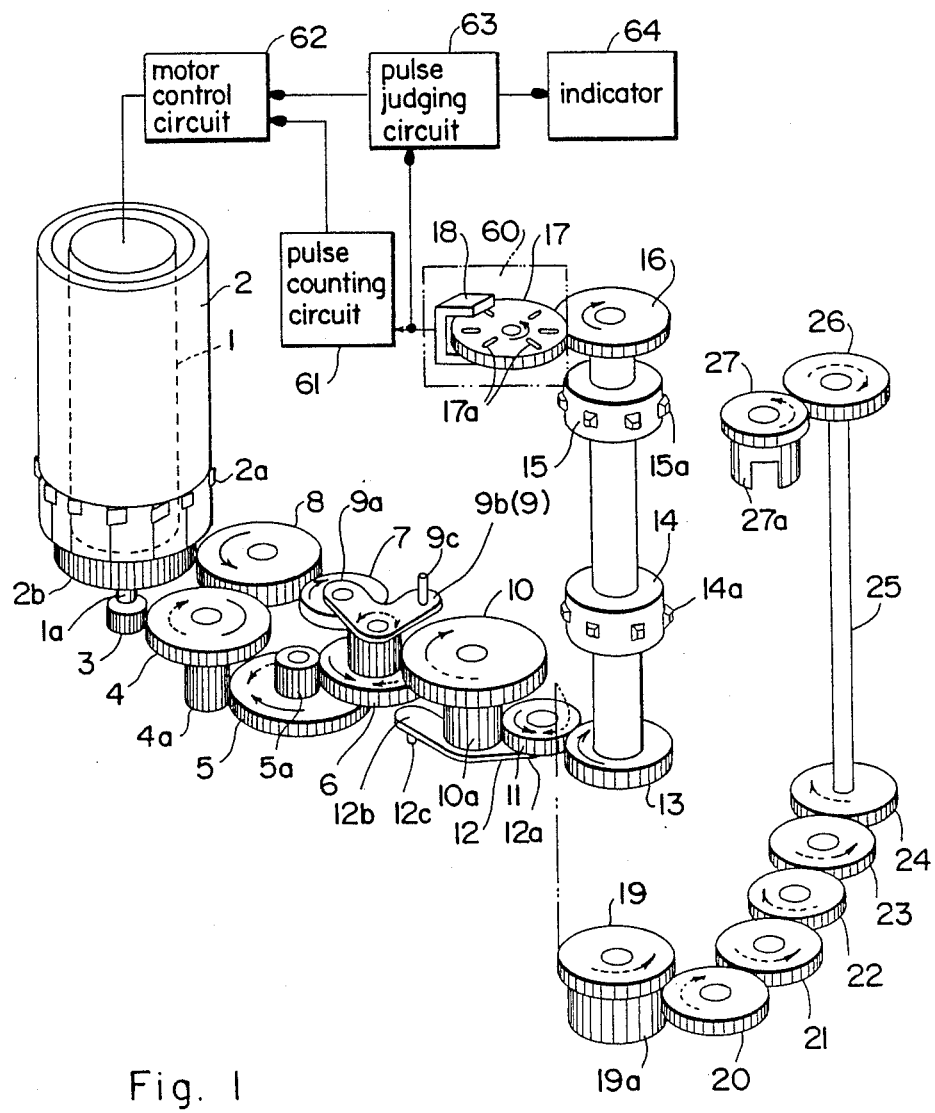
FIG. 1 is a perspective view of a sprocket mechanism of a camera according to one aspect of the present invention.

The following discussion will be directed to an embodiment of the present invention illustrated in the drawings.

In FIG. 1, the invention is applied to a spool drive type mechanism of a single-lens reflex camera. A motor 1 for winding and rewinding a film is housed in a spool 2. A drive shaft 1a, having a pinion 3, is connected to a sun gear 6a through a first reduction gear 4, a first reduction pinion 4a, a second reduction gear 5, a second reduction pinion 5a and a third reduction gear 6.

The sun gear 6a has a bifurcated planet lever 9 that is coaxial thereto and which can rotate relative thereto. One arm 9a of the planet lever 9 has a planet gear 7 supported thereby which is frictionally connected to the lever 9 and which is in mesh with the sun gear 6a. The planet gear 7 is brought into engagement with a spool gear 2b integral with the spool 2 through an idle gear 8 upon winding. The other arm 9b of the planet lever 9 has a stop pin 9c which restricts the swing movement of the lever 9.

The sun gear 6a is in mesh with a fourth reduction gear 10 to rotate another sun gear 10a coaxial thereto. The second sun gear 10a rotatably supports a second forked planet lever 12 coaxial thereto. One arm 12a of the second planet lever 12 supports a planet gear 11 which is frictionally connected thereto and which is in mesh with the sun gear 10a. The planet gear 11 comes into mesh with a lower sprocket gear 13 upon winding and with a rewinding first gear 19 upon rewinding, in accordance with the directions of the rotation of the planet gear 11. The second arm 12b of the planet lever 12 has a stop pin 12c which restricts the swing movement of the planet lever.

Note that the gear ratio is set so that the speed of the feeding of the film by the rotation of the sprocket 14 is smaller than that by the spool 2 (spool gear 2b) upon winding at which the planet gear 7 is in mesh with gear 8.

Figure 2:
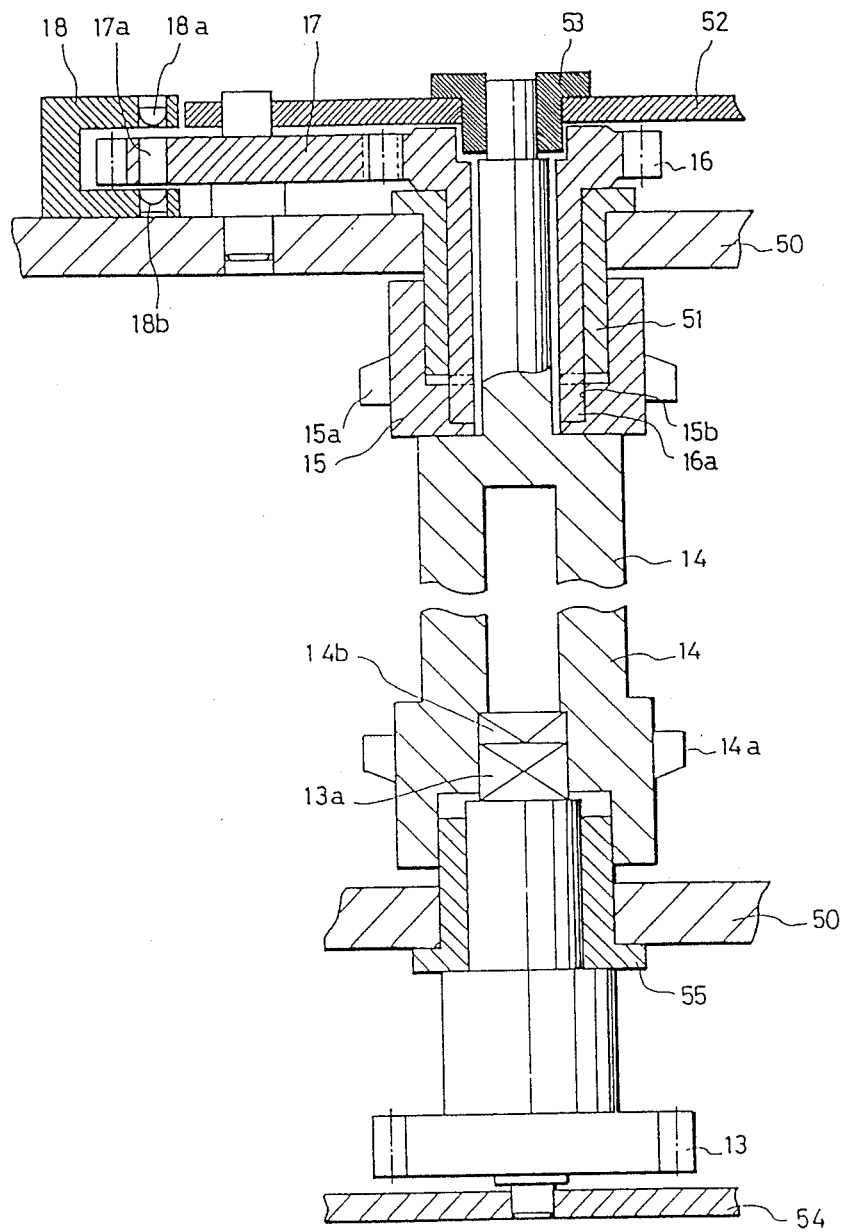
FIG. 2 is a longitudinal sectional view of a sprocket portion shown in FIG. 1.

The lower sprocket gear 13 rotates together with a lower sprocket 14. In the illustrated embodiment, an upper sprocket 15 is rotatable relative to the lower sprocket 14, as can be seen in FIG. 2. The upper sprocket 15 rotates together with a sprocket gear 16, which is in mesh with an encoder gear 17 that has the same number of teeth as the sprocket gear 16. The encoder gear 17 is provided, on its peripheral surface, with light transmission openings 17a (FIG. 3) which are spaced at an equiangular distance from each other and which has a phase the same as teeth 15a of the upper sprocket 15. Namely, in the illustrated embodiment, since there are six teeth 15a of the upper sprocket 15, six light transmission openings 17a are provided. A photointerrupter 18, which has a light emitter 18a and a light receiver 18b (FIG. 2) which are located on opposite sides of the encoder gear 17, forms a pulse generator 60 together with the encoder gear 17.

Figure 4:
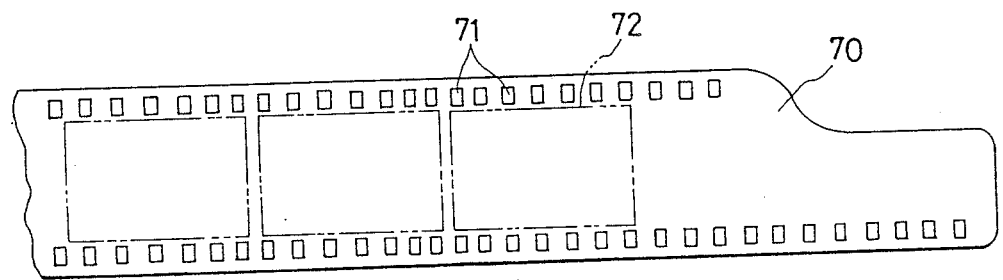
FIG. 4 is a plan view showing a positional relationship between perforations of a film and a picture plane (frame); and, FIG. 5 is a longitudinal sectional view of a switch portion on a back cover of a camera.

One of the most important features of the present invention is that the pulse generator 60 generates one pulse for one perforation 71 of the film 70 (FIG. 4). To this end, the light transmission openings 17a of the encoder gear 17 are located in the same phase arrangement as the teeth 15a of the upper sprocket 15.

In the illustrated embodiment, the upper sprocket 15 has six teeth 15a. Alternatively, in place thereof, a sprocket having eight teeth which is, per se, known can be used. In this alternative, the encoder gear 17 has eight light transmission openings 17a.

According to one of the features of the present invention, the pulses generated by the pulse generator 60 can be used not only to control the stopping of motor 1 but also to confirm the state of the film. Namely, the pulses from the pulse generator 60 are inputted to a pulse counting circuit 61. When it counts 8 pulses, the motor 1 is stopped by a motor control circuit 62. Also, the pulses from the pulse generator 60 are inputted to a pulse judging circuit 63 which operates a film state confirmation indicator 62, as shown in FIG. 1.

The first rewinding gear 19 is connected to a lower gear 24 which is secured to a lower end of a rewinding shaft 25 through a first rewinding gear pinion 19a and rewinding idle gears 20 to 23. To the upper end of the rewinding shaft 25 is secured a rewinding shaft gear 26 which is in mesh with a forked gear 27 having a rewinding fork 27a. The rewinding fork 27a is engaged by a film shaft (not shown) of a film patrone.

The following discussion will be addressed to a supporting mechanism of the lower sprocket 14 and the upper sprocket 15, with reference to FIG. 2.

The lower sprocket gear 13 is rotatably supported between a camera body 50 and a lower mother plate 54 through a bearing 55. The upper end of the lower sprocket gear 13 forms a rotation transmission shaft 13a which has a polygonal shape in section. The lower sprocket 14, which is provided, on its outer periphery, with six teeth 14a, has at its lower end a mating hole 14b which has a polygonal sectional shape corresponding to the shape of the rotation transmission shaft 13a, so that the latter can be fitted into the mating hole 14b to transmit the rotational movement. The upper end of the lower sprocket 14 is rotatably supported by an upper mother plate 52 through a bearing 53. The upper sprocket 15 is rotatably fitted onto the upper portion of the lower sprocket 14. The upper sprocket 15 has a hole 15b in which a fork 16a, provided on the sprocket gear 16, is fitted so as to rotate with the upper sprocket 15. The encoder gear 17 is rotatably supported between the camera body 50 and the upper mother plate 52. The photointerrupter (photocoupler) 18 is secured to the camera body 50.

Figure 5:
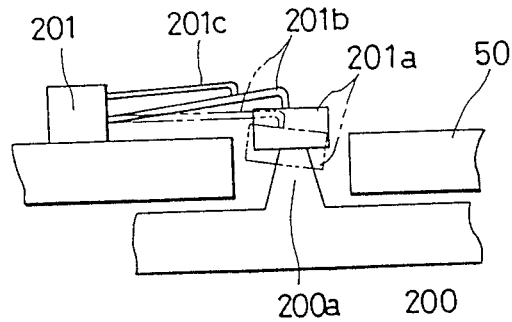

The motor driven camera as constructed above operates as follows:

In FIG. 1, the solid arrows designate the directions of rotation of the associated members upon winding, and the dotted arrows designate the direction of rotation of the associated members upon rewinding. The directions referred to hereinafter are those in FIG. 1. First, the film patrone is received in a patrone chamber, and the perforation 71 of the leader portion of the film 70 is engaged by the associated tooth 14a of the lower sprocket 14. When the back cover is closed, the motor 1 begins rotating in the direction shown at the solid arrow. In FIG. 5, which shows an actual arrangement of a back cover switch 201, e.g., when a projection 200a on the back cover 200 pushes a contact portion 201a provided on the front end of an elastic contact piece 201b of the back cover switch 201, the elastic contact piece 201b is brought into contact with a stationary contact piece 201c, so that an electrical connection is established between the two contact pieces 201b and 201c to drive the motor 1 through the motor control circuit 62.

When the motor 1 rotates in the direction shown by the solid arrow, the sun gear 6a rotates in the counter-clockwise direction, so that the planet lever 9, which is frictionally connected to the planet gear 7, swings to engage the planet gear 7 with the gear 8. As a result, the spool 2 rotates in the clockwise direction. At the same time, the sun gear 10a rotates in the clockwise direction and accordingly, the planet gear 11 is engaged by the lower sprocket gear 13 to rotate the lower sprocket 14 in the clockwise direction, so as to feed the film 70. The leader portion of the film 70, which is fed by the lower sprocket 14, comes into engagement with the spool 2, so that the perforations 71 of the film 70 are engaged by the associated claws 2a of the spool 2. As a result, the film 70 is wound onto the spool 2. It should be recalled that since the gear ratio is such that the amount of feed of the film by the lower sprocket 14 is less than the amount of wind of film by the spool 2, the lower sprocket 14 is rotated by the film 70, as mentioned before. Namely, the lower sprocket 14 becomes a driven shaft. As a result, the planet gear 11, which has been engaged by the lower sprocket gear 13, is sprung from the lower sprocket gear 13, so that both the gears 11 and 13 are no longer in mesh with each other. Consequently, the film 70 is wound only by the spool 2, so that when the initial position of the film is determined, i.e. when a predetermined number of frames of film is advanced, the motor 1 is stopped. This is a "winding-on" mechanism of the spool drive to determine the initial position of the film for photographing.

Upon winding-on (initializing), the teeth 15a of the upper sprocket 15 are engaged into the perforations 71 of the film 70, so that the upper sprocket 15 rotates in association with the feeding of the film. As a result, the encoder gear 17 is rotated by the sprocket gear 16, and the pulse generator 60 generates pulses. The generated pulses are inputted to the pulse judging circuit 63, so that the latter performs the confirmation (detection) of the state of the film through the indicator 64. Namely, the indicator 64 indicates that the film is loaded in accordance with the output of the pulse judging circuit 63 which judges the output of the pulses. Note that upon winding-on, the pulse counting circuit 61 counts a predetermined number of pulses (necessary for the winding-on operation). After the completion of winding-on, the motor 1 is driven again by the motor control circuit 62 when the first film frame is photographed. As a result, the spool 2 rotates to feed the film 70 through the above-mentioned intermediate gears which rotate in the directions shown by the solid arrows in FIG. 1. Consequently, the upper sprocket 15, which is engaged in the perforations 71 of the film, is rotated in association with the feeding of the film 70. At the same time, the encoder gear 17 is rotated by the sprocket gear 16. Thus, the pulse generator 60 generates one pulse when the film displaced an amount corresponding to one perforation. The number of pulses generated by the pulse generator 60 is counted by the pulse counting circuit 61. When the pulse counting circuit 61 counts 8 pulses, the motor control circuit 62 stops the motor 1. Since 8 perforations exactly corresponds to one frame of the film, the feeding of the film by one frame is ensured. This operation (advancing the film by one frame) occurs whenever the film 70 is wound at the completion of photographing one film frame. Since the pulses are generated for every perforation, the boundary lines between the adjacent picture planes 72 can be certainly and easily located between the adjacent perforations 71, as shown in FIG. 4. Therefore, when the film is cut, it is possible to prevent the cutting lines from lying on (or bridging) the perforations. This does not depend on the initial positions of the teeth 15a of the upper sprocket 15 prior to loading of the film.

The pulses generated by the pulse generator 60 are inputted to the pulse judging circuit 63, causing the indicator 64 to indicate the winding of the film so long as the pulses are outputted from the pulse generator 60. It is not necessary for the pulse judging circuit 63 to count the number of pulses. Furthermore, the pulse judging circuit 63 detects when no pulse has been generated for a predetermined period of time so as to detect the terminal end of the film. When the terminal end of the film is detected, the motor control circuit 62 supplies a reversing signal to the motor 1 to reverse the motor.

Upon receiving the reversing signal, the motor 1 and the members driven thereby are rotated in the directions shown by the dotted arrows, so that the planet lever 9, which is frictionally connected to the planet gear 7, swings to disengage the planet gear 7 from the gear 8, resulting in the spool 2 being free. Similarly, the planet lever 12, which is frictionally connected to the planet gear 11 swings to disengage the planet gear 11 from the lower sprocket gear 13, so that the planet gear 11 comes into engagement with the first rewinding gear 19. As a result, the lower sprocket 14 becomes free and the rewinding fork 27a rotates to rewind the film 70 into the patrone chamber.

The pulses generated by the pulse generator 60 during the rewinding operation are inputted to the pulse judging circuit 63 which causes the indicator 64 to indicate that the film is being rewound. When the rewinding operation is completed, the pulse judging circuit 63 detects that no pulses are generated for a certain period of time so as to detect the completion of the rewinding of the film. When the completion of rewinding is detected, a stop signal issued by the motor control circuit 62 stops the motor 1.

Preferably, the pulse generator 60 generates one pulse for each perforation 71. However, it is possible to use a pulse generator which generates one pulse for every two or four perforations 71.

Figure 3:
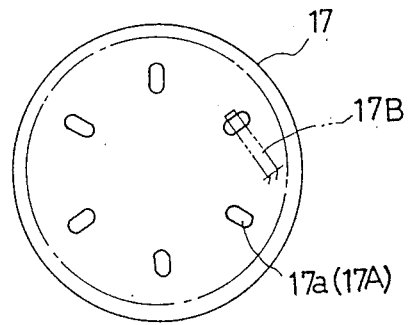
FIG. 3 is a plan view of an encoder gear shown in FIG. 1.

Although, in the illustrated embodiment, the pulse generator 60 comprises a photointerrupter, other known pulse generators can be used. For instance, it is possible to use a contact type pulse generator in which an encoder plate has lands, having the same phase as the teeth of the sprocket, rotates synchronously with the sprocket. The lands are selectively brought into contact with an electrical brush. The contact type pulse generator has an advantage that no electrical power is required. In the contact type pulse generator, the light transmission openings 17a in FIG. 3 are replaced with lands 17A equivalent thereto. The brush, which is to be selectively connected to the lands 17A, is designated by 17B in FIG. 3.

As can be understood from the above discussion, according to the present invention, both the mechanisms for feeding and stopping the film, frame by frame, and for detecting the state of the film can be determined by the production of pulses, resulting in a simple and small motor driven camera. Also, according to the present invention, the reliability of the switches is increased and the process of treatment of the circuit signals can be simplified. In addition to the foregoing, according to the present invention, in a spool drive type single-lens reflex camera, the sprocket is divided into upper and lower sprocket elements, so that the lower sprocket element can feed the film leader portion and the upper sprocket element generates the pulses for detecting the state of the film when the upper sprocket element rotates. According, it is not necessary to provide a special mechanism for detecting the state of the film, independently of the sprocket portion, resulting in the realization of a simple, inexpensive, small and compact motor driven camera.

I claim:

1. A motor driven camera having a motor for winding a film, said camera comprising a pulse generator which generates one pulse for every predetermined number of perforations of the film in association with feeding of the film, means for counting the number of pulses generated by said pulse generator, and a motor control circuit which stops said motor when said pulse counting means counts a predetermined number of pulses.

2. A motor driven camera according to claim 1, wherein said pulse generator generates one pulse for each perforation of the film, and the motor control circuit stops said motor when said pulse counting means counts eight pulses.

3. A motor driven camera according to claim 1, wherein said pulse generator generates one pulse for every two perforations on said film, and said motor control circuit stops said motor when said pulse counting means counts four pulses.

4. A motor driven camera according to claim 1, wherein said pulse generator generates one pulse for every four perforations of the film, and said motor control circuit stops said motor when said pulse counting means counts two pulses.

5. A motor driven camera according to claim 1, further comprising a pulse judging circuit to which said pulses from said pulse generator are inputted so as to detect said pulses of said pulse generator.

6. A motor driven camera according to claim 5, further comprising an indicator which indicates the state of film in response to the presence of said pulses detected by said pulse judging circuit and/or the duration of the pulses.

7. A motor driven camera according to claim 6, further comprising a rotatable sprocket which has teeth which can be engaged by the perforations of said film to feed said film.

8. A motor driven camera according to claim 7, wherein said pulse generator comprises an encoder plate which rotates in association with said sprocket, and which has light transmission openings which are located in the same phase arrangement as said teeth of said sprocket, and a photointerrupter which has a light emitter and a light receiver provided on opposite sides of said light transmission openings of said encoder.

9. A motor driven camera according to claim 8, wherein said sprocket has teeth spaced at an equiangular distance from each other, wherein said encoder plate has six light transmission openings corresponding to said teeth of said sprocket.

10. A motor driven camera according to claim 7, wherein said pulse generator comprises an encoder plate which rotates in association with said sprocket and which has lands located in the same phase arrangement as said teeth of said sprocket, and a brush which is selectively brought into contact with said lands.

11. A motor driven camera according to claim 10, wherein said sprocket has six teeth spaced at an equiangular distance from each other, wherein said encoder plate has six lands corresponding to said teeth of the sprocket.

12. A motor driven camera according to claim 7, wherein said sprocket comprises relatively rotatable upper and lower sprocket elements having teeth which are adapted to engage upper and lower perforations of said film.

13. A motor driven camera according to claim 12, wherein one of said upper and lower sprocket elements that is engaged by said perforations of said film leader portion forms a driving sprocket to which drive power is provided upon a loading of said film, wherein said other sprocket element forms a driven sprocket which is driven by said perforations of said film, so that said rotation of said driven sprocket generates said pulses.

14. A motor driven camera according to claim 1, wherein said motor control circuit comprises means for stopping said motor to locate the boundary lines defining adjacent picture frames between adjacent perforations of the film.

15. A single-lens reflex camera in which film is fed by a rotational drive of a sprocket having teeth which can be engaged by the perforations of a leader portion of said film upon loading of said film, and wherein said film is wound by rotatably winding a film receiving spool after said film leader portion is wound onto said spool, the improvement comprising a driving mechanism in which said sprocket comprises relatively rotatable upper and lower sprocket elements having teeth which can be engaged by upper and lower perforations of the film, one of said upper and lower sprocket elements engaged by said perforations of said film leader portion forming a driving sprocket of which drive power is provided upon loading of said film, the other sprocket element forming a driven sprocket which is driven by said perforations of the film, said driving mechanism comprising a pulse generator which generates pulses in accordance with rotation of said other sprocket element and a pulse judging circuit to which said pulses of said pulse generator are inputted to detect said pulses.

16. A drive mechanism according to claim 15, further comprising an indicator which indicates the state of said film in accordance with the presence and absence of said pulses detected by said pulse judging circuit and/or the duration of said pulses.

17. A drive mechanism according to claim 15, wherein said camera has a motor for driving the sprocket.

18. A drive mechanism according to claim 15, wherein said pulse generator generates one pulse for each perforation of said film.

19. A drive mechanism according to claim 15, wherein said pulse generator generates one pulse for every two perforations of said film.

20. A drive mechanism according to claim 15, wherein said pulse generator generates one pulse for every four perforations of the film.

21. A drive mechanism according to claim 15, further comprising a pulse counting means for counting the number of pulses generated by said pulse generator and a motor control circuit for stopping said motor when said pulse counting means counts a predetermined number of pulses.

22. A drive mechanism according to claim 21, wherein said predetermined number of pulses is two.

23. A drive mechanism according to claim 21, wherein said predetermined number of pulses is four.

24. A drive mechanism according to claim 21, wherein said predetermined number of pulses is eight.

25. A camera having a sprocket which has teeth engaged by perforations of a film, said sprocket being rotatable by feeding said film, the improvement comprising a drive mechanism which has a pulse generator which generates one pulse whenever said teeth of said sprocket pass a predetermined position, said pulse generator comprising means for defining boundary lines between the picture frames of the film, the boundary lines located between adjacent perforations of the film.

26. A drive mechanism according to claim 25, wherein said pulses generated by said pulse generator are used to control a stop position of said film.

27. A drive mechanism according to claim 25, wherein said pulses generated by said pulse generator are used to detect the state of the film.

* * * * *